Oct. 10, 1939.  A. I. EDDY  2,175,885
PRIMARY BATTERY
Filed Jan. 31, 1936  2 Sheets—Sheet 1
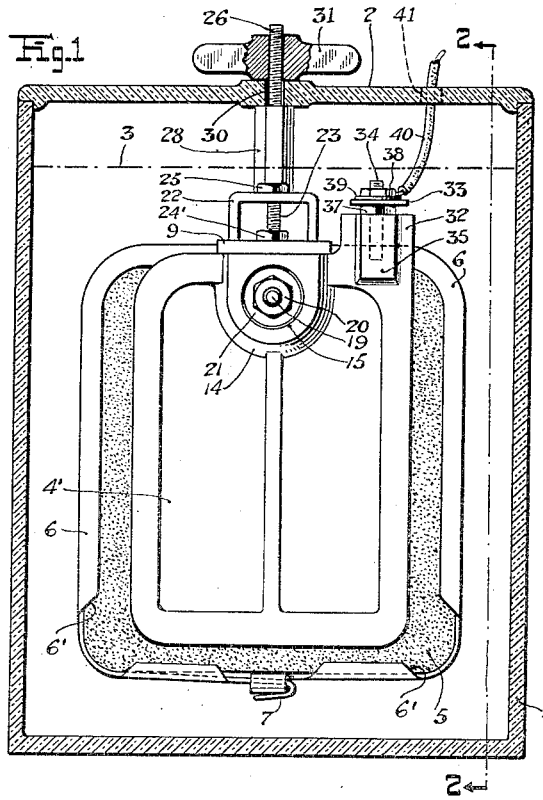
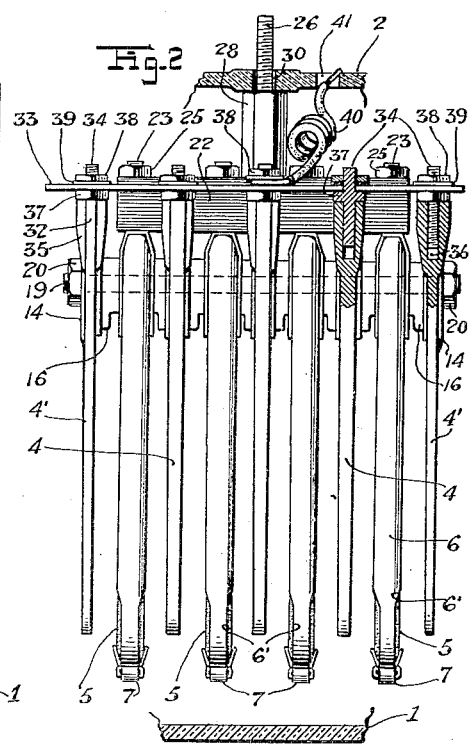
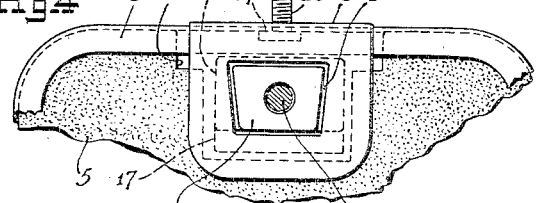
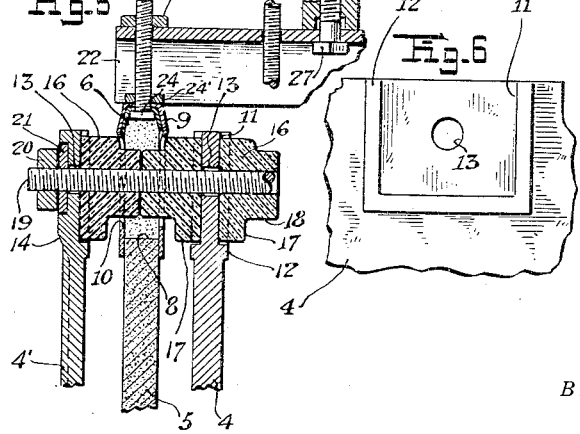
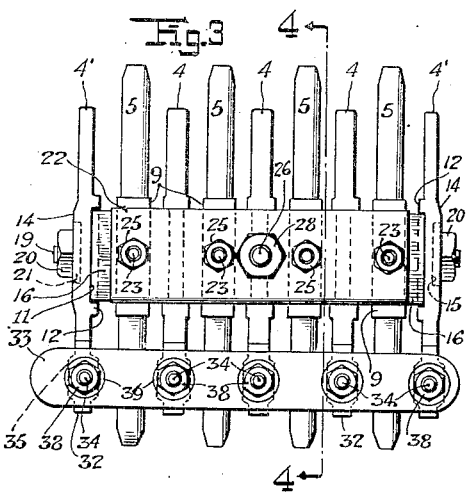
INVENTOR
Albert J. Eddy
BY Henry Lanahan
ATTORNEY

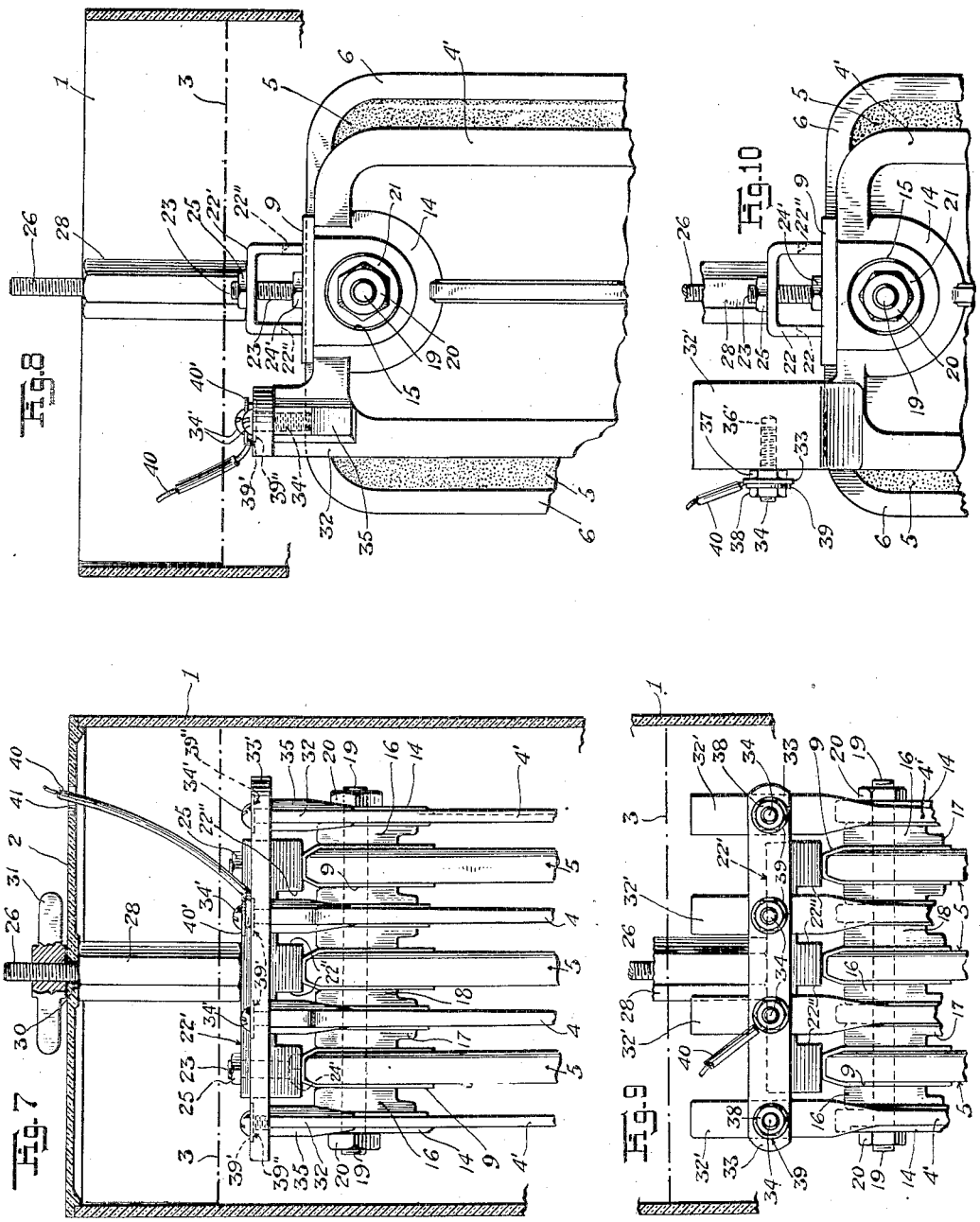

Patented Oct. 10, 1939

2,175,885

UNITED STATES PATENT OFFICE 2,175,885

PRIMARY BATTERY

Albert I. Eddy, West Caldwell, N. J., assignor to Thomas A. Edison, Incorporated, West Orange, N. J., a corporation of New Jersey Application January 31, 1936, Serial No. 61,738

8 Claims. (Cl. 136—115)

My invention relates to primary batteries and more particularly to primary battery cells of the type in which the positive and negative electrode elements are disposed in alternate relation and assembled into a unitary structure which is supported from the cell container or jar with the electrode elements thereof disposed in a caustic alkaline electrolyte. In battery cells of this character, the positive elements commonly consist of zinc and are in the form of plates or cylinders, and the negative elements commonly consist principally of oxide of copper or other suitable depolarizing material, which is either properly molded and agglomerated in the form of plates or cylinders or is packed within suitable perforated containers; and while not limited thereto, my invention is especially directed to improvements in primary battery cells wherein the negative electrode elements comprise molded and agglomerated plates of cupric oxide each of which is maintained between and in properly spaced and insulated relation to two positive electrode elements in the form of zinc plates. By the term positive elements, as herein used, I mean the elements or plates from which current flows through the electrolyte to the other or negative elements.

In primary battery cells of the character last referred to, it is common practice, in each such cell, to connect the flat negative element or elements to and support the same from a single suspension bolt or like member which is adapted to be attached to the cover of the jar or container wherein the electrode element assembly is to be disposed and which also serves as the negative electrode element terminal or positive pole of the cell, and to support the positive zinc elements or plates from the negative elements by means comprising a long threaded rod extending through upper portions of both the positive and the negative elements and also through suitable insulating and spacing members or blocks disposed between the adjacent positive and negative elements, such means also comprising nuts which are threaded on said rod and turned up tightly against the respective zinc plates so as to secure all said elements and blocks firmly together and provide a rigid unitary electrode element assembly. Heretofore, in the case of a battery cell having such an electrode element assembly, the threaded connecting and supporting rod and nuts referred to have also been relied upon to electrically connect the positive electrode elements and such rod has served as the positive electrode terminal or negative pole of the cell.

The type of construction just described has proven quite satisfactory for primary battery cells of ordinary capacities, that is capacities up to 500 ampere hours, and where not more than three positive zinc plates per cell are employed. At the present time, however, there is a very definite need and demand for primary battery cells of relatively high capacity, that is capacities as high as 1,000 ampere-hours and even more.

The obvious way to increase the capacity of a primary battery cell which is generally of the construction above described, is to correspondingly increase the surface area of the electrode elements. One way of accomplishing this without increasing the number of electrode elements employed, is to make such elements of greater size, as by increasing their width or length or both their width and length. However, there are several reasons why the use of electrode elements of increased size is impracticable and undesirable. For example, if wider plates or elements were used, cell containers or jars of greater width would be required, which is objectionable; if longer plates or elements were used, they would extend down deeper into the electrolyte with a resulting loss in efficiency; and also it would be considerably more difficult and expensive to produce satisfactory plates or elements of increased size, this being particularly true in the case of negative elements consisting of compressed and agglomerated masses of copper oxide or the like. Accordingly, it is preferable for the purpose of obtaining the desired results, to use a battery structure having a greater number of electrode elements or plates of substantially the same size and surface area as those commonly employed in primary battery cells of the type under discussion and of the usual or standard capacities, and it is with such a structure that my invention is chiefly concerned.

It has been found, however, that if in a battery cell of the construction and arrangement above described, the number of positive zinc plates or elements is increased beyond three, with a corresponding increase in the number of negative or copper oxide plates or elements, it is practically impossible to obtain good electrical contact between the electrode element connecting rod and each of the positive elements and such electrical contact, in the case of one or more of the positive elements or plates, becomes increasingly impaired as discharge of the cell progresses. Because of this poor electrical contact between the said connecting rod and the positive zinc elements or plates, a very uneven consumption of the latter takes place and it is likely that one or more of such plates will be or become entirely inoperative long before the expiration of the rated life of the cell.

The principal object of my invention is to provide in a primary battery cell of the character above described, an improved construction and arrangement whereby, regardless of the number of electrode elements or plates embodied in the cell, the zinc elements or plates will be and remain substantially equally active and the consumption thereof will progress evenly or uniformly during the discharging of the cell to a state of substantially complete exhaustion.

Another object of my invention is to provide for a battery cell of this character an improved electrode element assembly having novel means for effectively maintaining the positive or zinc elements or plates in good electrical connection with each other and with the negative pole of the cell until such elements or plates are substantially entirely consumed.

Other objects and features of my invention will be hereinafter more specifically described and claimed.

In order that my invention may be more clearly understood, attention is directed to the drawings which accompany and form part of this specification and in which:

Fig. 1 is a part sectional view of a primary battery cell provided with one form of my improved electrode element assembly, such assembly being shown in end elevation;

Fig. 2 is a view, partly in section and partly in side elevation, of the cell and electrode element assembly shown in Fig. 1;

Fig. 3 is a top plan view of the electrode element assembly shown in Figs. 1 and 2;

Fig. 4 is a detailed elevational view, partly in section, of the upper end portion of one of the negative elements or plates and its associated parts, which are shown in Figs. 1, 2 and 3;

Fig. 5 is a fragmental vertical sectional view taken longitudinally and centrally of the electrode element assembly shown in Fig. 3, parts being shown in elevation;

Fig. 6 is an elevational view of the central upper portion of one of the positive zinc elements or plates shown in Figs. 1, 2 and 3;

Fig. 7 is a view in side elevation, partly in section and partly broken away, of a battery cell provided with a modified form of electrode element assembly in accordance with my invention;

Fig. 8 is a view in end elevation, partly in section and partly broken away, of the cell shown in Fig. 7;

Fig. 9 is a view similar to Fig. 7 of a battery cell equipped with a further modified form of electrode element assembly in accordance with my invention; and Fig. 10 is a view in end elevation, partly broken away, of the electrode element assembly shown in Fig. 9.

Referring to Figs. 1 to 6 of the drawings, the battery cell shown therein comprises a jar or container 1, preferably formed of glass, having a cover 2 which may be formed either of glass or other suitable insulating material, such as porcelain, and an electrode element assembly suspended from the cover 2 and with the electrode elements or plates thereof immersed in a suitable electrolyte which partially fills the container. The electrolyte is maintained in the container 1 at a level, indicated at 3, somewhat above the tops of the electrode elements or plates, and where the negative elements or plates are formed of oxide of copper and the positive plates are of zinc, as in the battery cell illustrated, such electrolyte preferably consists of a substantially 20% solution of caustic potash.

The battery element assembly comprises a plurality of flat positive elements 4 and 4', preferably consisting of substantially rectangular cast zinc plates, and a plurality of flat negative elements 5, preferably consisting of substantially rectangular plates of highly compressed and agglomerated copper oxide. The positive and negative plates are disposed side by side in opposed and alternate relation, the number of positive plates being greater by one than the number of negative plates whereby each of the end or outer elements of the assembly is a zinc positive plate, and the arrangement being such that each of said end or outer elements is one of the two zinc plates 4' present in the assembly. In the operation of the cell, the zinc plates, which are the consumable active elements, are attacked more vigorously at the edges thereof and also those portions of the zinc plates which stand higher in the electrolyte are more vigorously attacked than lower portions thereof. Accordingly, in order that the initial effective surface areas of the positive plates may be maintained until the cell reaches a state of almost complete exhaustion, each of such plates, as is shown in the drawings, is provided with thickened edge portions and is also made of progressively decreasing thickness from the upper toward the lower end thereof. The intermediate zinc plates 4 are of corresponding thicknesses and preferably are otherwise identical in construction; but the end zinc plates 4' are not much more than half as thick as the intermediate plates 4 because of the fact that each of them is opposed to and coacts with but a single negative plate and is therefore consumed much less rapidly, and also, as will presently appear, plates 4' differ slightly in construction at the upper end portions thereof, from the intermediate plates 4.

The electrode element assembly of the cell shown in Figs. 1 to 6 comprises five positive elements and four negative elements, but it is to be understood that my invention is not limited in its application to structures having any given number of electrode elements and is subject to a wide variation in this respect. These positive and negative elements or plates are rigidly secured together in properly spaced and substantially parallel relation and with each positive plate insulated from each negative plate, in a manner presently to be described. Each of the negative copper oxide plates 5 is closely embraced at all four edge portions by a conductive frame 6 which may be formed either of copper or of suitable sheet metal coated with copper. Each frame 6 consists of a single channel-shaped member which is applied to one of the plates 5 and bent about the corners of the plate, as shown; the sides or flanges of said member being cut away, as indicated at 6', at those portions of the member bent about the lower corners of the plate 5 to facilitate the bending thereof. Also the side flanges of the frame applied to each plate 5 are terminated somewhat short of the ends of the frame, the resulting reduced end portions of the frame being secured firmly together directly beneath and substantially centrally of the lower edge of the plate, as indicated at 7, by providing one end portion with a loop or eye through which the other end portion is extended and then turned over.

Each negative plate 5 is provided centrally of its upper end portion with a stepped rectangular notch or recess 8, and applied to and embracing such recessed portion of the plate and the corresponding portion of the frame 6 applied to the plate is a saddle or channel member 9 formed of springy conductive material, preferably copper-plated sheet iron or steel. The side walls or flanges of the saddle 9 have trapezoidal aligned openings 10 which are somewhat smaller than but register with the notch or recess 8 of plate 5.

Each of the intermediate zinc plates 4 is provided on each face thereof and centrally of its upper end portion with a rectangular depression or recess 11 which extends downwardly from the upper edge of the plate and is surrounded at the opposite sides and bottom thereof by a thickened portion or rib 12 formed on the plate; and each of the end or outer zinc plates 4' is provided on its inner face only with a corresponding depression and a corresponding rib. Also the plates 4 and 4' are respectively provided substantially centrally of the depressions 11 thereof, with circular openings 13. Each end zinc plate 4' of the assembly is provided on its outer face and centrally of its upper end portion with an enlargement or boss 14 having a circular recess or countersink 15 concentric with the opening 13 therein.

In order to space and insulate the positive plates from the negative plates, a plurality of insulating blocks 16, preferably formed of porcelain, are provided. Each of the blocks 16 comprises a rectangular end portion 17 and a reduced portion 18 which is of trapezoidal form in cross section. The larger rectangular portions 17 of blocks 16 are respectively seated in the rectangular depressions 11 of the positive plates 4 and 4', and the reduced portions 18 of the blocks extend into the notches 8 of the respective adjacent negative plates 5 through the openings 10 in the corresponding saddles 9. The positive and negative plates and intervening spacing and insulating blocks 16 are mechanically rigidly secured together in the relation shown by a rod 19, which extends through the openings 13 in plates 4 and 4' and through corresponding openings provided in the insulating blocks, and nuts 20 threaded on the ends of such rod. Two washers 21 are mounted on the rod 19 and respectively seated in the recesses 15 of the outer plates 4'. In securing the positive and negative plates and insulating blocks together as described, nuts 20 are turned up very tightly against the washers 21 whereupon the shoulders formed between the portions 17 and 18 of the insulating blocks 16 engage the sides of saddles 9 about the openings 10 therein, and force them firmly against the respective adjacent faces of the plates 5. The rod 19, nuts 20 and washers 21 are formed of a metal, such as copper or steel, which is non-consumable in the operation of the cell.

Suitable means are provided for connecting together, both mechanically and electrically, the negative plates 5 and for supporting the entire electrode element assembly from the cover 2 of the cell container with the electrode elements disposed in the electrolyte, the illustrated form of which means will now be described. Reference character 22 represents a heavy bridging member which preferably has the form of an inverted U in transverse cross section and which extends above and transversely of the negative plates 5 with the lower edges thereof engaging the saddles 9 of all the plates 5. Each of the plates 5 is rigidly secured to the bridging member 22 and also electrically connected therewith by a bolt 23 having its head 24 disposed in the channel of the corresponding frame 6 and its threaded shank extending through aligned openings provided in the bases of the members 6, 9 and 22, said bolt having a nut 24' turned down thereon tightly against frame 6 and a nut 25 turned down on the upper end portion thereof into tight engagement with the bridging member 22. A long threaded rod or bolt 26 has its head 27 disposed in the channel of bridging member 22 and extends upwardly through an opening provided in the base of said bridging member, and a spacing nut 28 is turned down on the bolt 26 tightly against the bridging member. The upper end portion of bolt 26 extends through an opening 30 provided centrally of the cover 2, and a wing nut 31 threaded onto said bolt above the cover is turned down so as to bring the upper end of nut 28 into firm engagement with the lower surface of the cover. It is apparent that the entire electrode element assembly is thus supported and suspended from the cover 2 at a single point. All of the parts 22, 23, 24', 25, 26, 28 and 31 are formed of metal, preferably copper or copper plated iron or steel, which is non-consumable in the operation of the cell. Bolt 26 constitutes the negative electrode element terminal and the positive pole of the cell.

Heretofore in primary battery cells of the general construction and arrangement above described, the threaded rods (corresponding to the rod 19 of the cell shown in Figs. 1 to 6) extending through the positive and negative plates and the spacing and insulating blocks for mechanically rigidly securing the same together, have also been relied upon to electrically connect the positive plates and have served as terminals for the latter. However, for reasons hereinbefore set forth, it is quite impracticable in a primary battery cell of this character and wherein there are more than three positive plates, to rely upon the rod or bolt employed in securing the electrode plates and insulating blocks together, as the means for electrically connecting the positive plates and as the common terminal for such plates. Accordingly, as the principal feature of my invention, I have provided an improved construction for such a cell whereby a member which is independent of the said securing rod or bolt and which constitutes the terminal for the zinc positive plates, will be maintained in good electrical connection with each of the positive plates, thereby insuring uniform consumption of the latter during discharge of the cell, until such time as the cell reaches a state of substantially complete exhaustion. This improved construction in that embodiment of my invention shown in Figs. 1 to 6, comprises similar upward extensions 32 of the zinc plates 4 and 4', a terminal member 33 in the form of a thin bar or strip of conductive non-consumable metal, such as copper or steel, disposed in a horizontal position just above the extensions 32, and non-consumable connections comprising short threaded rods 34 firmly securing the member 33 to each of the plate extensions 32 in good electrical connection therewith. The extensions 32 are formed at the same corner portion of the respective plates 4 and 4', project the same distance above the main portions of such plates, and have very substantially thickened central vertical portions 35. The thickened portion 35 of each plate extension 32 is provided medially thereof with a vertical tapped opening or recess 36 into which the longer theaded portion of one of the rods 34 is turned down until a hexagonal collar 37 formed on such rod intermediate the ends thereof and somewhat closer to one end than the other, is brought into tight engagement with the upper end surface of the plate extension. The upper shorter end portions of rods 34 extend with a fairly close fit through openings provided in member 33, the latter being firmly secured against the collars 37 by nuts 38 which are turned up tightly on said rods. Washers 39 are preferably interposed between nuts 38 and member 33 for the purpose of facilitating the tightening of such nuts as well as to prevent the latter from loosening. Member 33, rods 34, nuts 38 and washers 39, are formed of a conductive metal, such as copper or copper-plated iron or steel, which is non-consumable in the operation of the cell. The parts 33, 34, 38 and 39 are also inactive in the operation of the cell, and when formed of metal such as copper or copper plated iron or steel these parts may be rendered so inactive in any suitable manner as by amalgamating the same. As the collars 37 of rods 34 are held very tightly against the positive plate extensions 32, the portions of the latter beneath said collars are protected to a considerable degree against the electrolytic action which occurs in the discharge of the cell. As those sections of the zinc plates highest in the electrolyte are most vigorously attacked during discharge of the cell, portions 35 of plate extensions 32 are made sufficiently thick so that they will still be intact adjacent the openings 36 and accordingly will be in good electrical connection with the rods 34, when the cell reaches a state of substantially complete exhaustion. Therefore, as the cell is discharged, the consumption of the zinc positive plates will progress at substantially uniform rates. Connection of the positive plates and terminal bar 33 to the circuit which the battery serves, may be effected by a conductor 40 having one end secured beneath the washer 39 on one of the connecting rods 34 and the other end extending upwardly through an opening 41 in the cell cover 2.

That form of battery cell shown in Figs. 7 and 8 is of the same construction and arrangement as the cell shown in Figs. 1 to 6, with the exceptions hereinafter noted, and like parts are designated by the same reference characters in both cases. The electrode element assembly of this modification of my invention is shown as having one less positive element and one less negative element than the element assembly of the cell shown in Figs. 1 to 6, although, as hereinbefore indicated, it is entirely feasible and within the scope of my invention to incorporate the same or a greater number of positive and negative elements in such assemblies. The bridging member 22' secured to and connecting the negative plates, as shown in Figs. 7 and 8, also differs from the corresponding bridging member 22 shown in Figs. 1 to 6 by being provided for the sake of lightness, with cutaway portions 22'' intermediate its points of engagement with the saddles 9. The only other way in which the two cells differ is in the construction employed for effecting and maintaining good electrical connection between the zinc plates and for insuring the maintenance of such connection until the cell reaches a state of substantially complete exhaustion. In the structure shown in Figs. 7 and 8, such connecting means, instead of the non-consumable terminal member or strip 33 shown in Figs. 1, 2 and 3, comprises a thick heavy terminal zinc bar 33' which is disposed in a horizontal position just above the extensions 32 of the zinc plates and with its under-surface engaging the upper end surfaces of the thickened portions 35 of such extensions. The terminal bar 33' is secured in this position with its under-surface pressing tightly against the thickened portions 35 by screws 34' which extend through openings in the bar 33' and into tapped vertical openings provided in such thickened portions medially thereof. The screws 34' are turned down so that their heads bear hard against washers 39' seated in circular recesses or countersinks 39'' which are provided in the upper side of the zinc bar. Screws 34' and washers 39' are formed of conductive and inactive non-consumable material, such as copper or copper-plated steel suitably treated, as by amalgamating, to render the same inactive. The conductor 40 for connecting the terminal bar 33' to the circuit to be supplied by the cell is, in this case, secured at one end between the washer 39' for one of the screws 34' and a like washer 40' disposed just beneath the head of said screw.

The construction above described is just as effective in maintaining good electrical connection between the positive plates throughout the life of the cell as the corresponding construction of the cell shown in Figs. 1 to 6, and under some circumstances may be preferred because the heavy zinc terminal bar 33' affords an additional supply of positive active material. It is difficult for the electrolyte to penetrate between the tightly engaging surface portions of terminal bar 33' and plate extensions 32 and in consequence the consumption of zinc at these points will proceed but slowly, while washers 39' serve to protect the subjacent portions of bar 33' from attack during discharge of the cell. Also because, as hereinbefore indicated, the reaction between the electrolyte and active zinc material tends to concentrate and become most intensified at the point or points where the active material stands highest in the electrolyte, the upper unprotected portions of the zinc bar 33' will be consumed with the greatest rapidity and there will be a resulting decrease in the intensity of such reaction at and adjacent the junctions between this bar and the plate extensions 32. However, bar 33', is of such thickness that it will not be eaten entirely through at any point between its connections with the positive plates 4 and 4' at any time before the cell reaches a state of almost complete exhaustion. Therefore with the construction described, all the positive plates will be maintained in good electrical connection with each other and with the terminal member 33', throughout the rated useful life of the cell.

Except for the construction employed in electrically connecting and providing a common terminal for the zinc positive plates, the cell shown in Figs. 9 and 10 is identical with that shown in Figs. 7 and 8, like parts being designated by the same reference character in both instances. In the structure of Figs. 9 and 10, the zinc positive plates 4 and 4', in place of the extensions 32 shown in Figs. 7 and 8, are provided with similarly located upwardly projecting extensions 32' which are substantially rectangular in form, are longer than said extensions 32, and preferably have a uniform thickness substantially equal to that of the thickened portions 35 of extensions 32. In this case exactly the same means is employed for providing a common terminal for the positive plates and for electrically connecting the same to the extensions of said plates as in the cell shown in Figs. 1 to 6; such means consisting of the terminal member or strip 33 and the short threaded rods 34, nuts 38 and washers 39 rigidly securing such terminal member to the plate extensions. All of the parts 33, 34, 38 and 39 are made of suitable non-consumable and inactive conductive material, such as copper or copper-plated steel suitably treated, as by amalgamating, to render the same inactive. In the modified structure under discussion, however, the terminal strip 33, while located above the main portions of the zinc plates 4 and 4' and extending, in the direction of its length, transversely to the cell container 1, is vertically disposed in the direction of its width and is secured to the plate extensions 32' at points of the latter which are respectively substantially medial thereof in the directions of their length and thickness. To effect such connection of terminal member 33 to the plate extensions 32', the latter are respectively provided with horizontal tapped openings 36' which extend inwardly from substantially medial points of the outer vertical faces thereof and are parallel to the vertical side faces thereof, into which openings the longer threaded end portions of the rods 34 are turned to bring the collars 37 up hard against the plate extensions.

The modified structure last described, is under certain circumstances to be preferred to the structures shown in Figs. 1 to 6 and Figs. 7 and 8.

The more massive plate extensions 32' afford a greater supply of positive active material in the cell. Also there is somewhat less likelihood of the electrical connections between the zinc positive plates and the terminal member 33 for these plates being destroyed or impaired during discharge of the cell, because a large part of each of the plate extensions 32' is disposed at a higher level in the electrolyte than the points of connection between said terminal member and plates, and such higher disposed parts will be subjected to a more concentrated and vigorous electrolytic action than those portions of the zinc plates adjacent said points of connection.

What I claim is:

1. A battery element assembly comprising a plurality of alternately arranged positive and negative elements each of said positive elements comprising a self-sustaining main body portion of active material which is consumable in the discharging operation of the battery for which the assembly is designed and a consumable extension integral with said main body portion and projecting beyond the confines of the latter, means maintaining said elements operatively associated with each positive element spaced and insulated from each adjacent negative element, and means independent of said first means for electrically connecting the positive elements, said electrically connecting means comprising a plurality of conductive but inactive and non-consumable parts in electrical connection with each other, said parts respectively extending into and terminating within portions of the said positive element extensions, the construction and arrangement being such that the said extension portions will remain intact, in the normal use of the assembly in a battery, until the main body portions of the positive elements are substantially entirely consumed.

2. A battery comprising a container having a body of electrolyte therein, a plurality of alternately arranged positive and negative plates disposed in said electrolyte, each of said positive plates comprising a self-sustaining main body portion of active consumable material and an extension of active consumable material integral with said body portion and projecting beyond the confines of the latter, means maintaining said plates operatively associated with each positive plate spaced and insulated from each adjacent negative plate, a conductive member disposed in the electrolyte, and a plurality of conductive but inactive non-consumable parts in electrical connection with said conductive member, said parts being separate and distinct from the positive plates but being respectively secured independently of each other to such positive plates in direct engagement with portions of the said extensions thereof, the construction and arrangement being such that the said extension portions will be protected from the electrolyte so that they will remain intact, in the normal use of the battery, until the positive plates are substantially entirely consumed.

3. A battery comprising a container having a body of electrolyte therein, a plurality of alternately arranged and substantially flat positive and negative electrode elements disposed in said electrolyte, said positive elements being consumable in the discharging operation of the battery, means mechanically securing said elements together in spaced relation and with each positive element insulated from each adjacent negative element, each of said positive elements having an integral consumable extension projecting above the main portion thereof, and means independent of said securing means for electrically connecting all of the positive elements, said electrically connecting means comprising a member formed of the same material as the positive elements and disposed in said electrolyte and conductive but inactive non-consumable elements separate and distinct from the positive elements, said inactive non-consumable elements extending through said member into said extensions respectively and acting to hold said member firmly in direct engagement with said extensions at points which are respectively spaced from the points at which the electrode elements are mechanically secured together.

4. A battery element assembly comprising a plurality of alternately arranged zinc plates and copper oxide plates, said zinc plates being consumable in the discharging operation of the battery for which the assembly is designed, means mechanically securing said plates together in spaced relation and with each zinc plate insulated from each adjacent copper oxide plate, each of said zinc plates having an integral extension of zinc projecting above the main portion thereof, and means independent of said securing means for electrically connecting the zinc plates, said electrically connecting means comprising a member of conductive material and a plurality of conductive but inactive non-consumable elements extending through said conductive member and having portions imbedded in said extensions respectively at points of the latter which are respectively substantially medial thereof in respect of their length and thickness and which are also respectively spaced from the points at which the plates are mechanically secured together.

5. A battery comprising a container having a body of electrolyte therein, a plurality of alternately arranged positive and negative elements disposed in said electrolyte, a plurality of said positive elements each comprising a self-sustaining main body portion of active consumable material and an extension of active consumable material integral with said body portion and extending beyond the confines of the latter, means maintaining said elements operatively associated with each positive element spaced and insulated from each adjacent negative element, and means independent of said first means for electrically connecting the said plurality of positive elements, said electrically connecting means comprising a plurality of conductive but inactive and non-consumable parts in electrical connection with each other, said parts being respectively secured independently of each other to the said plurality of positive elements in direct engagement with portions of the said extensions thereof which are within the said electrolyte, the construction and arrangement being such that the said extension portions will be protected from the electrolyte so that they will remain intact, in the normal use of the battery, until the main body portions of the said plurality of positive elements are substantially entirely consumed.

6. A battery element assembly comprising a plurality of alternately arranged positive and negative elements, each of a plurality of said positive elements comprising a self-sustaining main body portion of active consumable material and a comparatively thick extension of active consumable material integral with said main body portion and projecting beyond the confines of the latter, means maintaining said elements operatively associated with each positive element spaced and insulated from each adjacent negative element, and means independent of said first means for electrically connecting the said plurality of positive elements, said electrically connecting means comprising a plurality of conductive but inactive and non-consumable parts in electrical connection with each other, said parts being respectively connected to the said plurality of positive elements in direct engagement with portions of the said extensions of the latter which are so arranged relative to the other constituents of the assembly that they will remain intact, in the normal use of the assembly, until the main body portions of the said plurality of positive elements are substantially entirely consumed.

7. A battery comprising a container having a body of electrolyte therein, a plurality of alternately arranged positive and negative elements disposed in said electrolyte, said positive elements each comprising a self-sustaining main body portion of active material which is consumable in the discharging operation of the battery and a comparatively thick extension which is integral with and of the same material as said body portion and which projects beyond the confines of the latter, means maintaining said elements operatively associated with each positive element spaced and insulated from each adjacent negative element, and means independent of said first means for electrically connecting said positive elements, said electrically connecting means comprising a plurality of conductive but inactive and non-consumable parts in electrical connection with each other, said parts respectively extending with intimate contact into portions of the said extensions of the positive elements which are disposed in said electrolyte but which are so located relative to the other constituents of the battery that they will remain intact, in the normal use of the battery, until the main body portions of the positive elements are substantially entirely consumed.

8. A battery element assembly comprising a group of alternately arranged positive and negative elements, said group including a plurality of positive elements each comprising a self-sustaining main body portion of active consumable material and an extension integral with and projecting beyond the confines of said body portion, means maintaining said elements operatively associated with each positive element spaced and insulated from each adjacent negative element, and means independent of said first means for electrically connecting the positive elements, said electrically connecting means comprising a plurality of conductive but inactive non-consumable parts in electrical connection with each other, said parts each comprising a collar-like portion and a relatively reduced portion extending from such collar-like portion, the said reduced portions respectively extending into and terminating within the extensions of the said plurality of positive elements.

ALBERT I. EDDY.